United States Patent
Thiel et al.

(10) Patent No.: US 6,388,391 B2
(45) Date of Patent: May 14, 2002

(54) OPERATING METHOD FOR A DISCHARGE LAMP HAVING AT LEAST ONE DIELECTRICALLY IMPEDED ELECTRODE

(75) Inventors: Gerwin Thiel, Eichenau; Simon Jerebic, Regensburg, both of (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/765,302

(22) Filed: Jan. 22, 2001

(30) Foreign Application Priority Data

Feb. 9, 2000 (DE) .......................................... 100 05 975

(51) Int. Cl.⁷ .............................................. H05B 37/02
(52) U.S. Cl. ....................... 315/246; 315/276; 315/330
(58) Field of Search ................................ 315/246, 326, 315/330, 336, 358, 276

(56) References Cited

U.S. PATENT DOCUMENTS 6,259,214 B1 * 7/2001 Doell et al. .................. 315/246

FOREIGN PATENT DOCUMENTS

WO 99/05892 2/1999

* cited by examiner

*Primary Examiner*—David Vu
(74) *Attorney, Agent, or Firm*—Carlos S. Bessone

(57) ABSTRACT

The invention relates to a method for operating a discharge lamp, which has at least one dielectrically impeded electrode (2, 3), on a flyback converter, which applies periodically recurring voltage pulses to the discharge lamp (La1). If the discharge lamp (La1) has a starting aid (10), the voltage amplitude ($U_S$) of the voltage pulses is successively raised until a dielectrically impeded discharge is formed in the discharge lamp, and until the voltage amplitude ($U_S$) has reached the nominal operating voltage. If the discharge lamp (La1) has no starting aid, a first discharge which causes a partial ionization of the discharge medium is firstly ignited in the discharge lamp (La1). Immediately after the first discharge has been brought back to extinction, a dielectrically impeded discharge is ignited anew, and the voltage amplitude ($U_S$) of the voltage pulses is increased until the nominal operating voltage of the discharge lamp (La1) is reached.

4 Claims, 3 Drawing Sheets

Figure 1:
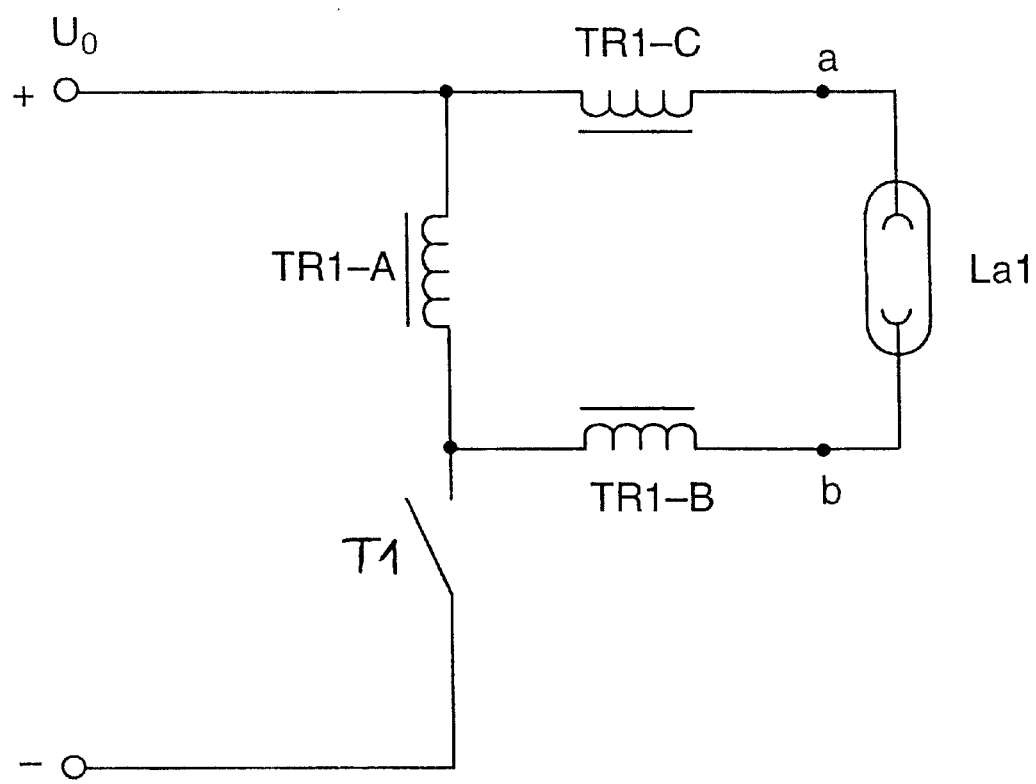

OPERATING METHOD FOR A DISCHARGE LAMP HAVING AT LEAST ONE DIELECTRICALLY IMPEDED ELECTRODE

The invention relates to an operating method for a discharge lamp having at least one dielectrically impeded electrode in accordance with the preamble of Patent claim 1 or 3. In particular, it concerns a method for igniting a dielectrically impeded discharge in a discharge lamp.

I. PRIOR ART

An operating method for a discharge lamp having dielectrically impeded electrodes, and a corresponding circuit arrangement for carrying out this method, are described in German Patent Application DE 197 31 275.6. During operation, periodically recurring voltage pulses which cause a dielectrically impeded discharge in the discharge lamp are applied to at least one of the dielectrically impeded electrodes. Depending on the geometry of the discharge vessel and the arrangement of the lamp electrodes, the peak value or amplitude of these voltage pulses is between approximately 1 kV and approximately 5 kV. The pulse repetition frequency is in the region of approximately 25 kHz to approximately 80 kHz. The voltage pulses are generated with the aid of a flyback converter and a transformer whose secondary windings are connected to the lamp electrodes. During the conducting phase of the flyback converter switching transistor, there is built up in the transformer a magnetic field whose electric energy is dissipated in the form of voltage pulses to the discharge lamp during the blocking phase of the flyback converter switching transistor. The discharge lamp is operated at its nominal operating voltage during the entire operating time, that is to say also during the starting phase. It has emerged that it is possible for there to form during ignition of a dielectrically impeded discharge in the discharge lamp preferred discharge channels which prevent the production of a dielectrically impeded discharge distributed uniformly over the length of the electrodes and cause an inhomogeneous light emission of the discharge lamp along the discharge vessel. Moreover, in the case of discharge lamps having dielectrically impeded electrodes it is not possible to improve the readiness of the discharge lamp to start by preheating the electrodes or with the aid of an electron emitter, in order by means of thermionic emission or by means of field emission to make available sufficient free charge carriers for igniting the discharge.

II. SUMMARY OF THE INVENTION

It is the object of the invention to specify an operating method for a discharge lamp having at least one dielectrically impeded electrode which ensures reliable ignition of the dielectrically impeded discharge in the lamp. In particular, the aim is to prevent the formation in the discharge lamp of individual, preferred discharge channels which would cause inhomogeneous light emission of the lamp.

This object is achieved according to the invention by the features of Patent claim 1 or 3. Particularly advantageous designs of the invention are described in the subclaims.

A particularly preferred first embodiment of the invention is disclosed in claim 1. This variant of the operating method according to the invention can be applied only to such discharge lamps having at least one dielectrically impeded electrode which have a starting aid. These are, in particular, aperture lamps whose discharge vessel is provided in part with a metallic coating, or whose discharge vessel is surrounded in part by an electrically conductive baffle, or discharge lamps whose discharge vessel bears a transparent, electrically conductive coating, for example an indium tin oxide layer (ITO layer). The abovenamed electrically conductive coatings or baffles are usually at frame potential and not only improve the electromagnetic compatibility of the lamps, but also act as capacitive starting aid.

In accordance with the first embodiment of the operating method according to the invention, for the purpose of igniting a dielectrically impeded discharge in the discharge lamp periodically recurring voltage pulses are applied to the at least one dielectrically impeded electrode, the voltage values of the voltage pulses being below the nominal operating voltage and being so low that the voltage pulses initially cause no ignition of the discharge. In the further course, the voltage values or voltage amplitudes of the periodically recurring voltage pulses are successively increased until a dielectrically impeded discharge forms in the discharge lamp. It has emerged that in the case of the abovementioned types of discharge lamps the ignition of a dielectrically impeded discharge already occurs with voltage pulses whose voltage values or voltage amplitudes are distinctly below the nominal operating voltage of the discharge lamp. The ignition of the dielectrically impeded discharge is performed in a gentle way, and no preferred discharge channels are formed. In particular, high voltage pulses are not applied to the electric components of the ballast immediately after connection. After performance of the ignition of a dielectrically impeded discharge in the discharge lamp, the voltage values or voltage amplitudes of the voltage pulses are advantageously successively further increased up to the nominal operating voltage of the discharge lamp.

In accordance with a second exemplary embodiment of the operating method according to the invention, a sequence of voltage pulses is applied to at least one dielectrically impeded electrode of the discharge lamp for the purpose of igniting a dielectrically impeded discharge, which pulses cause the discharge in the discharge lamp. Subsequently, the discharge is brought to extinction, and immediately after extinction of the discharge, there are applied to the at least one dielectrically impeded electrode periodically recurring voltage pulses which initiate a dielectrically impeded discharge in the discharge lamp. The operating method in accordance with the second embodiment can be used, in particular, with discharge lamps having at least one dielectrically impeded electrode which have no capacitive starting aid. The sequence of voltage pulses which generate the first discharge in the discharge lamp ensures the partial ionization of the discharge medium and generates free charge carriers. If preferred discharge channels should have formed in the discharge lamp during the first discharge caused by the sequence of voltage pulses, these channels collapse again after the end of the pulse sequence which had caused the first discharge. Immediately after the extinction of the first discharge, there are applied to the at least one dielectrically impeded electrode periodically recurring voltage pulses which have a sufficiently high voltage amplitude to cause a dielectrically impeded discharge. Since the dielectrically impeded discharge is initiated directly after the extinction of the first discharge, there are still sufficient free charge carriers present from the first discharge which permit the dielectrically impeded discharge to be ignited without a problem.

III. DESCRIPTION OF THE PREFERRED EXEMPLARY EMBODIMENTS

Figure 2:
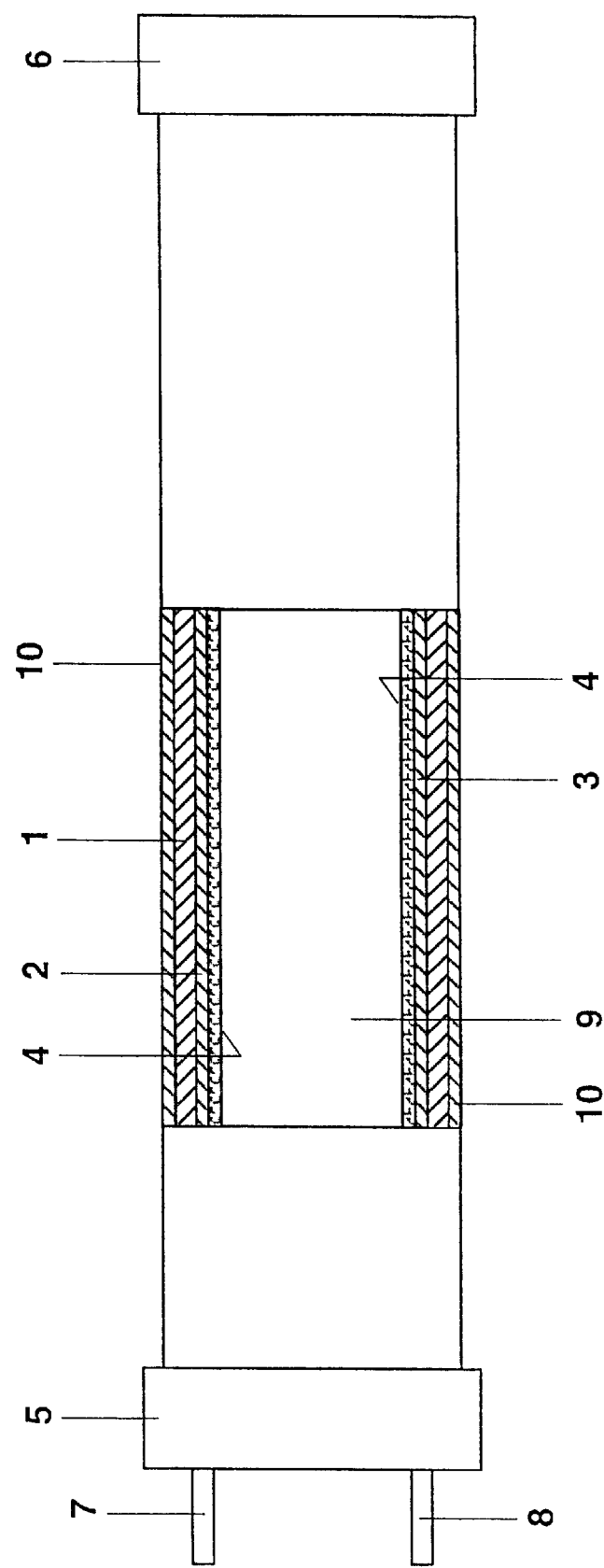
Figure 3:
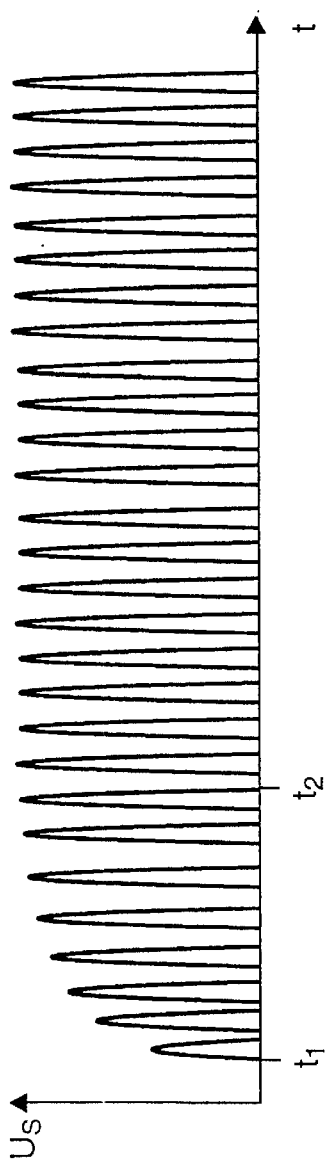
Figure 4:
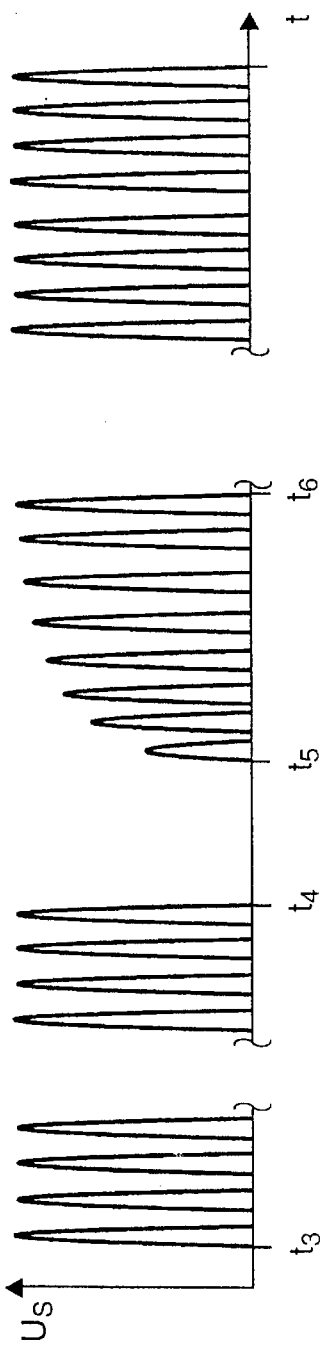
Figure 5:
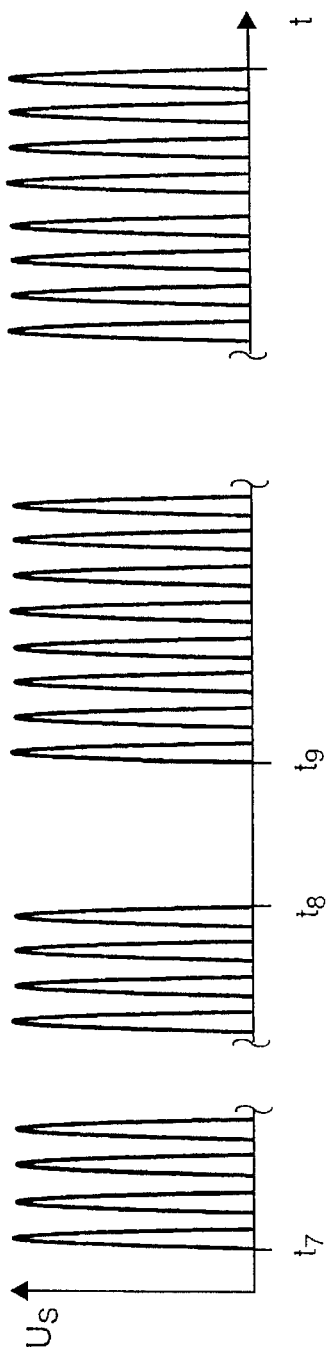

The operating method according to the invention is explained in more detail below with the aid of two exemplary embodiments. In the drawing:

FIG. 1 shows a diagrammatic illustration of a circuit arrangement for operating a discharge lamp having dielectrically impeded electrodes, and for carrying out the starting method according to the invention, FIG. 2 shows a cross section through a discharge lamp having dielectrically impeded electrodes, in a diagrammatic illustration, FIG. 3 shows a diagrammatic illustration of the voltage pulses during the starting phase of the discharge lamp, in accordance with the first exemplary embodiment of the invention, FIG. 4 shows a diagrammatic illustration of the voltage pulses during the starting phase of the discharge lamp in accordance with the second exemplary embodiment of the invention, and FIG. 5 shows a diagrammatic illustration of the voltage pulses during the starting phase of the discharge lamp in accordance with the third exemplary embodiment of the invention.

The two embodiments of the operating method according to the invention are described below in more detail with the aid of FIGS. 1 and 2.

The discharge lamp illustrated diagrammatically in FIG. 2 has a circular-cylindrical discharge vessel 1 with ends sealed in a gas-tight fashion. The two ends of the discharge vessel 1 are respectively provided with a cap shell 5, 6. One of the two cap shells 5 has two cap contacts 7, 8. Two strip-shaped, dielectrically impeded electrodes 2, 3, which extend in the longitudinal direction of the discharge vessel 1, are arranged opposite one another on the inner wall of the discharge vessel 1. The two electrodes 2, 3 are applied as strip-shaped metal layers to the inner wall of the discharge vessel 1, and are screened against the interior 9 of the discharge vessel 1 by a dielectric 4. The electrodes 2, 3 are each connected to one of the two cap contacts 7, 8 in an electrically conducting fashion. During operation of the lamp, a dielectrically impeded discharge forms between the two electrodes 2, 3, that is to say transverse to the longitudinal direction of the lamp. The striking distance of discharge therefore corresponds essentially to the inside diameter of the discharge vessel 1. In the ideal case, the dielectrically impeded discharge is distributed homogeneously along the two strip-shaped electrodes 2, 3. Xenon serves as discharge medium. Xenon excimer radiation which is converted into light with the aid of fluorescent material is generated in the discharge. Applied to the outer wall of the discharge vessel 1 is, for example, a metallic coating 10 which is at frame potential and has a transparent aperture extending in the longitudinal direction of the discharge vessel 1 or, for example, a transparent indium tin oxide layer 10 connected to the frame potential of the circuit arrangement. The lamp in accordance with the exemplary embodiment is a discharge lamp having dielectrically impeded electrodes 2, 3 which has a nominal operating voltage of approximately 2.4 kV and a nominal electric power of approximately 18 W. This discharge lamp is operated with voltage pulses whose pulse repetition frequency is approximately 25 kHz to 100 kHz.

A circuit arrangement for operating and, in particular, also for igniting the discharge lamp is illustrated, very diagrammatically, in FIG. 1. The circuit arrangement is designed as a flyback converter which has a DC voltage source $U_0$ of, for example, 24 V or 12 V, a field effect transistor T1 with a drive device (not illustrated), a transformer TR1-A, TR1-B, TR1-C and terminals a, b for a discharge lamp La1. The terminals a, b are respectively connected to a cap pin 7, 8 of the discharge lamp illustrated in FIG. 2. The design and mode of operation of this circuit arrangement are described in detail in the German Patent Application DE 197 31 275.6.

The drive device essentially comprises a square-wave oscillator known per se which generates pulse-width modulated rectangular signals for controlling the gate voltage of the field effect transistor T1, and which thereby controls the switching state of the field effect transistor T1. As long as the field effect transistor T1 is in the conducting state, the DC voltage $U_0$ is essentially present at the primary winding TR1-A, and a current which rises linearly with time flows through the primary winding TR1-A and the field effect transistor T1 and reaches its peak value $I_{max}$ at the end of the On period of the field effect transistor T1. At this instant, the electric energy W $$W = 0.5 \cdot L_P \cdot I_{max}^2 \tag{1}$$

is stored in the magnetic field of the primary winding TR1-A with the inductance $L_P$.

During the blocking phase of the field effect transistor T1, the electric energy W stored in the magnetic field of the primary winding TR1-A is reduced, and essentially dissipated to the lamp La1. Because of its dielectrically impeded electrodes 2, 3, the lamp La1 has a non-negligible capacitance of magnitude $C_L$ and forms a resonant circuit together with a primary winding TR1-A. During the blocking phase of the field effect transistor T1, a voltage pulse with the voltage amplitude of $U_P$ $$U_P = \sqrt{\frac{2 \cdot W}{C_L} - U_0} \tag{2}$$

is generated at the primary winding TR1-A.

With the aid of the secondary winding TR1-B, the voltage amplitude $U_P$ of the voltage pulses is stepped up in the ratio of $n_S/n_P$ of the turns $n_S$ of the secondary windings TR1-B, TR1-C and of the primary winding $n_P$ to the value of $U_S$ $$U_S = \frac{n_S}{n_P} \cdot U_P. \tag{3}$$

Consequently, a voltage pulse with the voltage amplitude of $U_S$ is available at the discharge lamp La1 as operating or starting voltage. During the blocking phase of the field effect transistor T1, voltage pulses of positive polarity are applied to the discharge lamp La1. Any voltage pulses of negative polarity are clamped at frame potential by the freewheeling diode (not illustrated) arranged in parallel with the drain-source path of the field effect transistor T1 and integrated in the field effect transistor T1. The field effect transistor T1 switches with a clock frequency of approximately 25 kHz to 100 kHz. Consequently, voltage pulses which have a pulse repetition frequency of approximately 25 kHz to 100 kHz are applied to the discharge lamp La1.

In accordance with the first exemplary embodiment of the invention, after the circuit arrangement is started up the above-described flyback converter is firstly used to generate voltage pulses whose voltage amplitude is so low that no discharge can be ignited in the discharge lamp La1. For this purpose, immediately after the circuit arrangement is started up the field effect transistor T1 of the flyback converter is operated by means of the drive device with a minimum On period which is determined by the dimensioning of the components of the drive device. It may be seen from formulae (1) to (3) that the voltage $U_S$ available to the discharge lamp La1 increases linearly with the current intensity $I_{max}$ which grows, in turn, linearly with the On duration of the field effect transistor T1. The voltage $U_S$ available at the discharge lamp La1 is therefore correspondingly low, so that no discharge can take place. Ignition of the discharge in the discharge lamp La1 is not initiated until after termination of the transient recovery phase of the flyback converter. The On period of the field effect transistor T1 is continuously increased with the aid of the drive device. The duration of the blocking phase of the field effect transistor T1 remains constant, by contrast. It is slightly longer than the duration of a voltage pulse. In accordance with formulae (1) and (3), the voltage amplitude $U_S$ of the voltage pulses available at the discharge lamp La1 and generated by the transformer TR1 also grows in accordance with the On period of the field effect transistor T1. The On period of the field effect transistor T1 is increased continuously until a dielectrically impeded discharge forms in the discharge lamp La1 and until the nominal operating voltage of the discharge lamp La1 of 2.4 kV is reached. It has emerged that a dielectrically impeded discharge forms in the discharge lamp La1 as early as in the case of voltage pulses with a voltage amplitude of, for example, only 1.9 kV. The igniting voltage required to ignite the dielectrically impeded discharge is markedly below the nominal operating voltage of the discharge lamp La1. The metallic coating 10 or the indium tin oxide coating 10 connected to the circuit-internal frame potential acts as capacitive starting aid. The voltage pulses are diagrammatically illustrated in FIG. 3. The voltage amplitude $U_S$ is plotted in arbitrary units along the vertical axis, and the horizontal axis forms the time axis. The voltage amplitude $U_S$ of the voltage pulses rises continuously from a minimum value up to the nominal operating voltage between the instants $t_1$ and $t_2$, which define a time interval of approximately 100 ms to 1 s. The ignition of the dielectrically impeded discharge in the lamp takes place in this time period. Subsequently, the lamp is operated at its nominal operating voltage. The pulse repetition frequency of the voltage pulses is approximately 100 kHz.

The second embodiment of the operating or starting method according to the invention is provided for discharge lamps having dielectrically impeded electrodes which have no starting aid. In accordance with the second embodiment of the operating method according to the invention, the field effect transistor T1 is operated with a maximum On period immediately after the start-up of the flyback converter. This means that as early as immediately after the start-up of the flyback converter voltage pulses whose voltage amplitude is equal to the nominal operating voltage of the discharge lamp La1 are applied to the discharge lamp La1. Consequently, immediately after the start-up of the flyback converter a dielectrically impeded discharge forms in the discharge lamp La1. The discharge is brought to extinction again immediately after its production in order to eliminate any inhomogeneities in the discharge caused, for example, by the formation of preferred discharge channels. The extinction of the discharge can be achieved in different ways, for example by shortening the On period of the field effect transistor T1, such that the voltage amplitude of the voltage pulses present at the discharge lamp La1 is minimized. Immediately after the extinction of the first discharge, a dielectrically impeded discharge is ignited anew in the discharge lamp La1. Since the discharge medium is still partially ionized by the first discharge, and not all free charge carriers are yet recombined, the second dielectrically impeded discharge can already be ignited with voltage pulses whose voltage amplitude $U_S$ is markedly below the nominal operating voltage of the discharge lamp La1. In the case of the operating method in accordance with the second exemplary embodiment, as well, the lengthening of the On period of the field effect transistor T1 raises the voltage amplitude $U_S$ of the voltage pulses up to the point at which the nominal operating voltage of the discharge lamp La1 of 2.4 kV is reached. The voltage pulses are illustrated diagrammatically in FIG. 4. The voltage amplitude $U_S$ is plotted in arbitrary units along the vertical axis, and the horizontal axis forms a time axis. The time axis is not represented true to scale. The time axis has been interrupted at two points in order to illustrate this. In particular, the representation of the idle time interval $t_5$, $t_6$ has become much too short by comparison with that of the time interval $t_3$, $t_4$. During the time interval defined by the two instants $t_3$ and $t_4$, which corresponds approximately to 20 times a period of a voltage pulse, that is to say approximately 0.2 ms, a first sequence of voltage pulses are applied to the discharge medium in the lamp and ignite a first discharge in the lamp. During the subsequent idle time interval, lasting approximately 2 ms to 3 ms, which is defined by the instants $t_4$ and $t_5$, voltage pulses are not applied to the lamp La1. The first discharge is extinguished within this idle time interval. At instant $t_5$, voltage pulses of continuously growing voltage amplitude $U_S$ are applied to the lamp La1. During a period of approximately 100 ms to 1 s, defined by the instants $t_5$ and $t_6$, the voltage amplitude $U_S$ of these voltage pulses is continuously increased, starting from a minimum value, up to the nominal operating voltage of approximately 2.4 kV. A dielectrically impeded discharge is ignited in the lamp La1 in this time interval. Subsequently, the lamp La1 is operated at its nominal operating voltage. The pulse repetition frequency is also approximately 100 kHz here.

Illustrated diagrammatically in FIG. 5 is a third exemplary embodiment of the starting method according to the invention, which constitutes a variant of the second exemplary embodiment. The voltage amplitude $U_S$ is plotted in arbitrary units along the vertical axis, and the horizontal axis forms a time axis. The time axis is not represented true to scale. The time axis has been illustrated interrupted at two points in order to illustrate this. In particular, the representation of the idle time interval $t_8$, $t_9$ has become much too short by comparison with that of the time interval $t_7$, $t_8$. During the time interval defined by the two instants $t_7$ and $t_8$, which corresponds approximately to 20 times a period of a voltage pulse, that is to say approximately 0.2 ms, a first sequence of voltage pulses are applied to the discharge medium in the lamp and ignite a first discharge in the lamp. During the subsequent idle time interval, lasting approximately 2 ms to 3 ms, which is defined by the instants $t_8$ and $t_9$, voltage pulses are not applied to the lamp La1. The first discharge is extinguished within this idle time interval. Voltage pulses are applied at the instant $t_9$ to the lamp La1 whose voltage amplitude $U_S$ corresponds to the nominal operating voltage of approximately 2.4 kV. The pulse repetition frequency of the voltage pulses is approximately 100 kHz.

What is claimed is:
1. Method for operating a discharge lamp which has at least one dielectrically impeded electrode (2, 3) and a starting aid (10), periodically recurring voltage pulses being applied to the at least one electrode (2, 3) of the discharge lamp (La1), characterized in that there are applied to the at least one electrode (2, 3) periodically recurring voltage pulses whose voltage values ($U_S$) are below the nominal operating voltage of the discharge lamp (La1) and are so low that these voltage pulses initially cause no ignition of the discharge, and in the further course of the method the voltage values ($U_S$) of the periodically recurring voltage pulses are successively increased until a dielectrically impeded discharge forms in the discharge lamp (La1).

2. Method according to claim 1, characterized in that after ignition of the dielectrically impeded discharge is performed the voltage values ($U_S$) of the periodically recurring voltage pulses continue to be successively increased until the discharge lamp (La1) is operated at its nominal operating voltage.

3. Method for operating a discharge lamp having at least one dielectrically impeded electrode (2, 3) on a circuit arrangement, periodically recurring voltage pulses being applied to the at least one dielectrically impeded electrode (2, 3) of the discharge lamp (La1), characterized in that there is applied to the at least one dielectrically impeded electrode (2, 3) a sequence of voltage pulses which cause a discharge in the discharge lamp (La1), the discharge is brought to extinction, and immediately after extinction of the discharge, there are applied to the at least one dielectrically impeded electrode (2, 3) periodically recurring voltage pulses which cause a dielectrically impeded discharge in the discharge lamp (La1).

4. Method according to claim 3, characterized in that after the extinction of the discharge, the voltage values ($U_S$) of the periodically recurring voltage pulses for igniting the dielectrically impeded discharge are successively raised, starting from a value below the nominal operating voltage of the discharge lamp (La1), until the nominal operating voltage is reached.

* * * * *